United States Patent
Riemer et al.

(10) Patent No.: US 10,463,991 B2
(45) Date of Patent: Nov. 5, 2019

(54) USE OF POLYMER POWDER COMPOSITIONS THAT CAN BE REDISPERSED IN WATER AND HAVE CATIONIC FUNCTIONALITY, AS FLOCCULATION AID

(71) Applicant: Wacker Chemie AG, München (DE)

(72) Inventors: Christoph Riemer, München (DE); Manuela Brandmeier, Tüssling (DE); Manfred Selig, Burghausen (DE); Oliver Stratmann, Burghausen (DE)

(73) Assignee: Wacker Chemie AG, Munich (DE)

( * ) Notice: Subject to any disclaimer, the term of this patent is extended or adjusted under 35 U.S.C. 154(b) by 85 days.

(21) Appl. No.: 15/518,337

(22) PCT Filed: Oct. 6, 2015

(86) PCT No.: PCT/EP2015/073046
§ 371 (c)(1),
(2) Date: Aug. 7, 2017

(87) PCT Pub. No.: WO2016/058867
PCT Pub. Date: Apr. 21, 2016

(65) Prior Publication Data
US 2018/0161699 A1 Jun. 14, 2018

(30) Foreign Application Priority Data
Oct. 15, 2014 (DE) .................... 10 2014 220 859

(51) Int. Cl.
| | |
|---|---|
| *B01D 21/01* | (2006.01) |
| *C08F 218/08* | (2006.01) |
| *C08F 2/20* | (2006.01) |
| *C08F 226/04* | (2006.01) |
| *C02F 1/56* | (2006.01) |
| *C08L 23/08* | (2006.01) |
| *C02F 103/10* | (2006.01) |
| *C02F 103/14* | (2006.01) |
| *C02F 103/16* | (2006.01) |
| *C02F 103/32* | (2006.01) |
| *C02F 103/34* | (2006.01) |

(52) U.S. Cl.
CPC ............... *B01D 21/01* (2013.01); *C02F 1/56* (2013.01); *C08F 2/20* (2013.01); *C08F 218/08* (2013.01); *C08F 226/04* (2013.01); *C08L 23/0853* (2013.01); *C02F 2103/10* (2013.01); *C02F 2103/14* (2013.01); *C02F 2103/16* (2013.01); *C02F 2103/32* (2013.01); *C02F 2103/343* (2013.01)

(58) Field of Classification Search
None
See application file for complete search history.

(56) References Cited

U.S. PATENT DOCUMENTS

| | | | |
|---|---|---|---|
| 3,956,122 A | 5/1976 | Coscia et al. | |
| 4,784,776 A | 11/1988 | Mangravite, Jr. | |
| 5,874,524 A | 2/1999 | Pakusch et al. | |
| 6,559,236 B1 | 5/2003 | Willimann et al. | |
| 7,611,632 B1 | 11/2009 | Wang et al. | |
| 2007/0032677 A1 | 2/2007 | Herth et al. | |
| 2007/0173586 A1* | 7/2007 | Herth ................. | B01D 21/01 524/457 |
| 2009/0030168 A1 | 1/2009 | Schorm et al. | |
| 2016/0280599 A1 | 9/2016 | Seidel | |

FOREIGN PATENT DOCUMENTS

| | | |
|---|---|---|
| DE | 10337763 A1 | 3/2005 |
| DE | 102013223305 A1 | 5/2015 |
| EP | 07700640 A2 | 5/1997 |
| EP | 0872497 A2 | 10/1998 |
| EP | 1294644 B1 | 3/2003 |
| WO | 0005275 A1 | 2/2000 |
| WO | 0005283 A1 | 2/2000 |
| WO | 0053815 A1 | 9/2000 |
| WO | 2005023885 A1 | 3/2005 |
| WO | 2007093551 A1 | 8/2007 |
| WO | 2010086217 A2 | 8/2010 |

OTHER PUBLICATIONS

Jiang, et al. Catalyst Letters, 2006, 110, 101-106. (Year: 2006).*
International Search Report and Written Opinion for International Application No. PCT/EP2015/073046, dated Jan. 11, 2016—9 Pages.
W. John et al., "Synthesis and Use of PolyDADMAC for Water Purification", Biennial Conference of the Water Institute of Southern Africa, May 2002, 13 pages.
E. W. Flick, "Water Soluble Resins—An Industrial Guide", Noyes Publications, Park Ridge, NJ, 1991, 20 pages.
Schulze J., "Redispersionspulver im Zement", TIZ,vol. 109, No. 9, 1985 with English Abstract, 7 pages, Abstract only considered.
Brochure: "Polyelektrolyte entwässern Klärschlämme optimal" [Polyecetrolytes Achieve Optimal Dewatering of Sewage Sludges], publisher:Deutsches Zentrum für Luft-und Raumfahrt e. V. [German Aerospace Center], Bonn, Jan. 2003 with English abstract, 5 pages, Abstract only considered.

* cited by examiner

*Primary Examiner* — Clare M Perrin
(74) *Attorney, Agent, or Firm* — RatnerPrestia

(57) ABSTRACT

The invention relates to the use of polymer powder compositions that can be redispersed in water and have cationic functionality, as flocculation aid, for example for dewatering waters or waste waters that are laden with solids.

6 Claims, No Drawings

USE OF POLYMER POWDER COMPOSITIONS THAT CAN BE REDISPERSED IN WATER AND HAVE CATIONIC FUNCTIONALITY, AS FLOCCULATION AID

CROSS-REFERENCE TO RELATED APPLICATIONS

This application is a U.S. National Phase Application of PCT International Application PCT/EP2015/073046, filed Oct. 6, 2015, which claims priority benefit of German Application DE 10 2014 220 859.9, filed Oct. 15, 2014, the disclosures of which are incorporated herein in their entirety.

BACKGROUND

The invention relates to the use of water-redispersible polymer powder compositions having cationic functionality as flocculation aid.

Flocculation aids are used wherever solid-liquid separation is desired. The flocculation aids are used in solid-liquid separation processes such as the cleaning of communal and industrial wastewaters in water treatment plants, the processing of process and circulation water, and the treatment of untreated and surface water to obtain service water and drinking water. The flocculation aids accelerate the sedimentation or flotation of suspended solid particles and bring about a crucial improvement in the dewatering characteristics of the sludges thus thickened in static or machine dewatering methods. Furthermore, the dewatering of sludges is a process where the important factor is to remove the maximum amount of water from the sludges with minimum expenditure.

To date, almost exclusively polymers based on acrylamide or copolymers of acrylamide and cationic monomers such as diallyldimethylammonium chloride (DADMAC) have been used as flocculation aids. A problem is that acrylamide is classified as carcinogenic and, as a consequence, there are bans on the use thereof in some countries or at least plans to impose them. In addition, in the case of use of polyacrylamide products, because of the residual acrylamide monomer content, the landfill disposal and reuse of dewatered sludge in agricultural areas is banned.

As an alternative to the conventional flocculation aids, therefore, polymers of diallyldimethylammonium chloride (DADMAC) have been used (brochure: Polyelektrolyte entwässern Klärschlämme optimal [Polyelectrolytes Achieve Optimal Dewatering of Sewage Sludges], publisher: Deutsches Zentrum für Luft-und Raumfahrt e. V. [German Aerospace Center], Bonn, January 2003) (cleaner production.de/fileadmin/assets/pdfs/Externe_Projektbeschreibungen/Polyelektrolyte.pdf)

The efficiency of the use of poly-DADMAC in water treatment was examined in W. John et al., Synthesis and Use of PolyDADMAC for Water purification, May 2002 (http://www.ewisa.co.za/literature/files/127%20Paper. PDF). A disadvantage of poly-DADMAC is the relatively high costs of these polymers.

The problem addressed was therefore that of providing polymers of cationic monomers in an administration form which makes them suitable for use as flocculation aids in minimum amounts, It has been found that, surprisingly, water-redispersible polymer compositions having cationic functionality are of excellent suitability as flocculation aids. Polymer powder compositions of this kind contain cationic polymers which have been used as protective colloids for stabilization during the polymerization or as drying aid in the course of drying of the corresponding polymer dispersions.

EP 0 770 640 A2 discloses water-redispersible polymer powders which are obtained by drying a polymer dispersion after addition of a positively charged polyelectrolyte. The powders thus obtained are recommended as binders in hydraulically setting materials, paints and adhesives. There is no description of use as flocculation aids.

WO 00/05275 A1 and WO 00/05283 A1 disclose water-redispersible polymer powder compositions having cationic functionality which are obtained by polymerizing ethylenically unsaturated monomers in the presence of cationic monomers, and spray-drying the polymer dispersion thus obtained with polyvinyl alcohol as drying aid. The polymer powders thus obtained are described as being suitable for use in adhesives, coating compositions, hydraulically setting building materials, as filler materials in chromatography columns and as carrier for delayed release of active ingredients. There is no description of use as flocculation aids.

WO 2007/093551 A1 and DE 102013223305 A1 describe water-redispersible polymer powder compositions having cationic functionality, which are obtained by free-radically polymerizing ethylenically unsaturated monomers in aqueous medium, and drying the polymer dispersion obtained after addition of a cationic protective colloid. Described examples of the use of these products are application in chemical products for construction, and use in adhesives and coatings. There is no description of use as flocculation aids.

WO 2005/023885 A1 describes a pulverulent, water-soluble, cationic polymer composition containing at least two cationic polymers of different molecular weight, a first cationic polymer being formed in the presence of a second cationic polymer by the method of gel polymerization, and the gel thus obtained being mechanically comminuted. The powder is used as flocculation aid.

SUMMARY

The invention provides for the use of water-redispersible polymer powder compositions having cationic functionality as flocculation aids.

Water-redispersible polymer powder compositions refer to powder compositions obtainable by means of drying the corresponding aqueous dispersions of the base polymers in the presence of protective colloids (drying aid). Because of this production process, the finely divided resin of the dispersion is ensheathed with a water-soluble protective colloid in a sufficient amount. In the drying, the protective colloid acts like a shell which prevents the conglutination of the particles. On redispersion in water, the protective colloid dissolves again in water and affords an aqueous dispersion of the original polymer particles (Schulze J. in TIZ, No. 9, 1985).

The cationic functionality of the water-redispersible polymer powder compositions is introduced by means of cationic polymers, i.e. by means of polymers having monomer units containing cationic groups. These cationic polymers can be used in the form of protective colloids for stabilization during the polymerization of the base polymer and/or as drying aid in the drying of the corresponding polymer dispersion. The procedure may also be that the cationic polymer is added to an aqueous polymer dispersion after the preparation thereof, and the aqueous polymer dispersion thus obtained, optionally after addition of drying aid, is dried.

DETAILED DESCRIPTION

The water-redispersible polymer powder compositions having cationic functionality can be prepared by the methods described in WO 2007/093551 A1 or DE 102013223305 A1, the details of which in this regard are part of this application (incorporated here by reference). This involves free-radically polymerizing one or more ethylenically unsaturated monomers in the presence of protective colloid and/or emulsifier in an aqueous medium (base polymer), then drying the aqueous polymer dispersion obtained after addition of a protective colloid as a drying aid, the cationic functionality being introduced by using a cationic polymer in the polymerization and/or in the drying.

Suitable cationic polymers are polymers having cationic charge, as described, for example, in E. W. Flick, Water-Soluble Resins—an Industrial Guide, Noyes Publications, Park Ridge, N.J., 1991. Preference is given to homo- or copolymers of one or more cationic monomers having a quaternary ammonium group from the group comprising diallyldimethylammonium chloride (DADMAC), diallyldiethylammonium chloride (DADEAC), (3-methacryloyloxy)-propyltrimethylammonium chloride (MPTAC), (2-methacryloyloxy)-ethyltrimethylammonium chloride (METAC), (3-methacrylamido)propyltrimethylammonium chloride (MAPTAC). Particular preference is given to the polymer of diallyldimethylammonium chloride (poly-DADMAC).

In general, the cationic polymers contain 50% to 100% by weight, preferably 60% to 100% by weight, more preferably 90% to 100% by weight, most preferably about 100% by weight, of cationic monomer units having a quaternary ammonium group, based on the total weight of the cationic polymer. Suitable nonionic copolymerizable monomers are vinyl esters having 1 to 15 carbon atoms in the carboxylic acid radical, such as vinyl acetate, acrylamide, hydroxyethyl (meth)acrylate, hydroxypropyl (meth)acrylate, esters of methacrylic acid and acrylic acid with alcohols having 1 to 15 carbon atoms, such as methyl methacrylate or butyl acrylate, and also N-vinylpyrrolidone, N-vinylcaprolactam, and/or mixtures of the nonionic comonomers mentioned.

The cationic polymers having quaternary ammonium groups can be prepared by means of polymerization methods known to those skilled in the art. Cationic polymers suitable for the preparation of the water-redispersible polymer powder compositions having cationic functionality are also commercially available. For example, polydiallyldimethylammonium chloride (Poly-DADMAC) is available as Catiofast® BP (BASF) or Superfloc® C-592 (Kemira Water Solutions B.V) or Drewfloc® 462 (Ashland Inc.).

Monomers suitable for the preparation of the aqueous polymer dispersions of the base polymer are vinyl esters of unbranched or branched alkylcarboxylic acids having 1 to 15 carbon atoms, methacrylic esters and acrylic esters of alcohols having 1 to 15 carbon atoms, vinylaromatics, olefins, dienes or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 9 to 13 carbon atoms, for example VeoVa9® or VeoVa10® (trade names of Momentive), Particular preference is given to vinyl acetate.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A preferred vinyl halide is vinyl chloride.

It is optionally also possible for 0.05% to 10% by weight, based on the total weight of the monomers, of auxiliary monomers to be included in the copolymer. Examples of auxiliary monomers are stabilizing monomers such as ethylenically unsaturated mono- and dicarboxylic acids, ethylenically unsaturated carboxamides and carbonitriles, ethylenically unsaturated sulfonic acids or salts thereof.

Examples of homo- and copolymers that are suitable as base polymer are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers.

Preference is given to vinyl acetate homopolymers and copolymers of vinyl acetate with 1% to 40% by weight of ethylene, which optionally also contain further comonomers from the group of vinyl chloride and vinyl esters having 3 to 12 carbon atoms in the carboxylic acid radical, where the auxiliary monomers mentioned may in each case be included in the copolymers in the amounts specified, and the figures in % by weight add up to 100% by weight in each case.

The homo and copolymers are preferably prepared by the emulsion polymerization method, wherein the polymerization temperature is generally but not necessarily <100° C., and wherein the copolymerization of gaseous comonomers such as ethylene can also proceed under pressure, generally between 5 bar and 100 bar. The polymerization is initiated with the initiators or redox initiator combinations that are commonly used for emulsion polymerization.

Stabilization of the polymerization mixture is accomplished using protective colloids, optionally in combination with emulsifiers. Preferred protective colloids are partly hydrolyzed polyvinyl alcohols having a hydrolysis level of 80 to 95 mol % and a Höppler viscosity in 4% aqueous solution of 1 to 30 mPas (Höppler method at 20° C., DIN 53015), and the cationic polymers mentioned, especially poly-DADMAC, or mixtures of the partly hydrolyzed polyvinyl alcohols mentioned with cationic polymer, for example poly-DADMAC. More preferably, no cationic polymer is used in the polymerization.

The cationic polymer can be added to an aqueous polymer dispersion of a base polymer that has been stabilized with emulsifiers and/or protective colloids, even after the preparation thereof.

For preparation of the water-redispersible polymer powder compositions, the dispersions, optionally after addition of further protective colloid as drying aid, are dried, for example by means of fluidized bed drying, freeze drying or spray drying. Preferably, the dispersions are spray-dried. The spray drying is effected in customary spray drying systems, and the atomization can be effected by means of one-phase, two-phase or multiphase nozzles or with a rotating disk. The exit temperature is generally chosen within the range from 45° C. to 120° C., preferably 60° C. to 90° C., according to the system, Tg of the resin and the desired degree of drying. The viscosity of the feed to be atomized is adjusted via the solids content so as to obtain a value of <500 mPas (Brookfield viscosity at 20 revolutions and 23° C.), preferably <250 mPas. The solids content of the dispersion to be atomized is >35%, preferably >40%.

In general, the drying aid is used in a total amount of 0.5% to 30% by weight, based on the polymer constituents of the dispersion. This means that the total amount of protective colloid prior to the drying operation may be 1% to 30% by weight, based on the polymer component. Preferably, 5% to 20% by weight of protective colloid, based on the polymer component, are used. The amount of protective colloid in this case is preferably 1% to 20% by weight, more preferably 3% to 10% by weight, based in each case on the polymer component in the redispersible polymer powder.

Suitable drying aids are the protective colloids that have already been mentioned. Preference is given to partly hydrolyzed polyvinyl alcohols having a hydrolysis level of 80 to 9.5 mol % and a Happier viscosity in 4% aqueous solution of 1 to 30 mPas (Höppler method at 20° C., DIN 53015) and the cationic polymers mentioned, and also mixtures of the partly hydrolyzed polyvinyl alcohols mentioned and the cationic polymers mentioned. Particular preference is given to using a cationic polymer as drying aid, and with most preference diallyldimethylammonium chloride polymer (poly-DADMAC) is used.

In the atomization, in many cases, a content of up to 1.5% by weight of antifoam, based on the base polymer, has been found to be favorable. One example of an antifoam is Agitan$^R$ 299 from Münzing. To increase the storability by improving the blocking stability, especially in the case of powders having low glass transition temperature, the powder obtained can be provided with an antiblocking agent (anticaking agent), preferably 1% to 30% by weight, based on the total weight of polymeric constituents. Examples of antiblocking agents are calcium carbonate or magnesium carbonate, talc, gypsum, silica, kaolins such as metakaolin, silicates having particle sizes preferably in the range from 10 nm to 10 µm.

Most preferred are water-redispersible polymer powder compositions comprising vinyl acetate homopolymer or comprising copolymers of vinyl acetate and 1% to 40% by weight of ethylene, which contain a diallyldimethylammonium chloride polymer (poly-DADMAC) as cationic polymer. Such products are also commercially available, for example Vinnapas$^R$ 4040E from Wacker Chemie AG.

The water-redispersible polymer powder compositions having cationic functionality contain generally 1% to 10% by weight, preferably 3% to 5% by weight, of a cationic polymer, based in each case on the total weight of the polymeric constituents of the water-redispersible polymer powder composition.

The water-redispersible polymer powder compositions having cationic functionality can be used as flocculation aids in powder form or having been dispersed in water. The aqueous dispersion is obtained by simply stirring the polymer powder composition into water.

The amounts of flocculation aid required for the flocculation reaction depend on the field of use. They are known to the person skilled in the art and can be determined and optimized by simple tests. In general, the use amounts are in the ppm by weight range, preferably from 1 to 1000 ppm by weight, more preferably from 10 to 500 ppm, most preferably from 50 to 500 ppm, based in each case on the weight of the suspension to be dewatered.

Specific examples of the use are the dewatering of waters or wastewaters laden with solids. These may be any communal or industrial wastewaters, for example wastewaters from water treatment plants, or the dewatering of sludges, for example harbor sludges that have been pumped out or excavated, or from paint shops in the automobile industry, or process waters, suspensions and sludges in mines for obtaining coal or ore, or in oil and gas production, or wastewaters from a wide variety of different industrial operations (for example from agroindustrial, biological, biochemical, chemical, foods industry, petrochemical, pharmaceutical industry, paper and wood industry, metal industry and mechanical engineering operations), or else untreated water which is used as industrial process water for cooling or raising steam in, for example, the abovementioned industrial operations.

With the flocculation aid of the invention, surprisingly, the advantages which follow have been obtained. The flocculation aid contains, as well as the cationic polymer component, a predominant component of thermoplastic polymer with an adhesive effect at ambient temperature. This obviously leads, after the coagulation of solid particles with the positive charges of the cationic protective colloid component, to rapid agglomeration of the coagulated primary particles. This results in formation of large and rapidly sedimenting flocs which can easily be separated from the water phase.

This rapid flocculation to form large particles of sediment is not only obtained in the case of use of the flocculation aid in aqueous dispersion, but also—because of the excellent dispersibility—in the case of addition thereof in solid form. The flocculation aid of the invention can consequently be used directly in solid form and not just exclusively in solution, as is the case for polyacrylamide or for poly-DADMAC. This achieves a significant facilitation of logistics (transport) and use.

The examples which follow serve to further elucidate the invention:

Flocculation Aids Used:
Poly-DADMAC: Drewfloc 462 (polydiallyldimethylammonium chloride (Poly-DADMAC) from Ashland)

Flocculation Aid 1 (FA1):
An aqueous dispersion of a vinyl acetate-ethylene copolymer having a glass transition temperature Tg of −6° C. and having a solids content of the aqueous dispersion of about 50% by weight, which has been prepared with 6% by weight of polyvinyl alcohol, having a hydrolysis level of 88 mol % and a Höppler viscosity (in 4% by weight solution at 20° C. according to DIN 53015) of 4 mPas, was mixed with 3% by weight of Drewfloc 462, based on the total weight of the polymeric constituents. This mixture was spray-dried with addition of 12% by weight of calcium carbonate (Omyacarb 5GU) as antiblocking agent, based on the total weight of the polymeric constituents. The powder thus obtained was referred to as flocculation aid 1.

Flocculation Aid 1 Liquid (FA 1 li):
Flocculation aid 1 (FA1) was dispersed in water, by stirring FA1 into water in such an amount that an aqueous dispersion of FA1 with a solids content of 50% by weight has been obtained.

Testing Procedure:
In a 2 liter beaker, 200 ml of a sewage sludge from a biological water treatment plant (solids content about 2% by weight) was diluted to 1000 ml with water. In each case, 100 mg of (solid) flocculation aid were added to the diluted sewage sludge, and the mixture was stirred for 5 seconds and then transferred to a measurement vessel provided with a milliliter scale. After 20 min, the mixtures were filtered through a fluted paper filter into a beaker and, after filtration for 10 min, the volume of the filtrate was determined in each case.

The results of the testing are compiled in table 1.

In comparative example C1, no flocculation aid was used.

In comparative example C2, 100 ppm of poly-DADMAC was used as flocculation aid.

In example 3, 100 ppm of flocculation aid 1 (FA 1) was used as flocculation aid.

In example 4, 100 ppm of (solid) flocculation aid 1 in liquid form (FA 1 li) was used as flocculation aid.

TABLE 1

|  | (Comparative) example | | | |
| --- | --- | --- | --- | --- |
|  | C1 | C2 | 3 | 4 |
| Filter aid (FA) | — | Poly-DADMAC | FA 1 | FA 1 li |
| Amount of FA (ppm in solid form) | — | 100 ppm | 100 ppm* | 100 ppm (solid)** |
| Filtrate after 10 min (mL) | 38 | 178 | 71 | 50 |

*The redispersible polymer powder FA 1 contains about 3% by weight of poly-DADMAC. Therefore, only about 3 ppm of cationic polymer is used.
**The redispersible polymer powder FA 1 contains about 3% by weight of poly-DADMAC and was used in the form of an aqueous dispersion with solids content 50% by weight, i.e. 200 ppm of polymer dispersion was used.

The test results show that, with inventive examples 3 and 4, in spite of the significantly lower proportion (1/33) of cationic polymer, a distinct improvement in flocculation is obtained compared to the blank value of comparative example 1.

The invention claimed is:

1. A method of treating water or wastewater laden with solids, comprising adding to said water or wastewater a flocculation aid comprising a water-redispersible polymer powder composition having cationic functionality, the water-redispersible polymer powder composition comprising a base polymer comprising one or more monomers selected from the group consisting of vinyl esters of unbranched or branched alkylcarboxylic acids having 1 to 15 carbon atoms, methacrylic esters and acrylic esters of alcohols having 1 to 15 carbon atoms, vinylaromatics, olefins, dienes, and vinyl halides, and a cationic polymer comprising a homo- or copolymer comprising one or more cationic monomers having a quaternary ammonium group selected from the group consisting of diallyldimethylammonium chloride (DADMAC), diallyldiethylammonium chloride (DADEAC), (3-methacryloyloxy)propyltrimethylammonium chloride (MPTAC), (2-methacryloyloxy)ethyltrimethylammonium chloride (METAC), and (3-methacrylamido)propyltrimethylammonium chloride (MAPTAC), wherein the cationic polymer contains 50% to 100% by weight of cationic monomer units having a quaternary ammonium group, based on the total weight of the cationic polymer, and wherein the base polymer is selected from the group consisting of a vinyl acetate homopolymer, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

2. The method as claimed in claim 1, wherein the water-redispersible polymer powder composition having cationic functionality comprises 1% to 10% by weight of the cationic polymer, based on the total weight of the base and cationic polymers comprising the water-redispersible polymer powder composition.

3. The method as claimed in claim 1, wherein the base polymer is selected from the group consisting of a vinyl acetate homopolymer and copolymers of vinyl acetate with 1% to 40% by weight of ethylene.

4. The method as claimed in claim 3, wherein the vinyl acetate copolymer comprises a comonomer selected from the group consisting of vinyl chloride and vinyl esters comprising a carboxylic acid radical having 3 to 12 carbon atoms.

5. The method as claimed in claim 1, wherein the base polymer is a vinyl acetate homopolymer or a copolymer of vinyl acetate and 1% to 40% by weight of ethylene, and the cationic polymer is a diallyldimethylammonium chloride polymer (poly-DADMAC).

6. The method as claimed in claim 1, wherein the water-redispersible polymer powder composition having cationic functionality is added to the water or wastewater laden with solids in an amount of 1 to 1000 ppm by weight, based on the weight of the water or wastewater laden with solids to be treated.

* * * * *